United States Patent [19]

Cassell et al.

[11] 4,178,801

[45] Dec. 18, 1979

[54] MEASUREMENT OF GAS-LIQUID FLOW

[75] Inventors: Don S. Cassell; Brice W. Kinyon, both of Chattanooga, Tenn.

[73] Assignee: Combustion Engineering, Inc., Windsor, Conn.

[21] Appl. No.: 950,183

[22] Filed: Oct. 10, 1978

[51] Int. Cl.² .................. G01F 1/34; B01D 45/16
[52] U.S. Cl. ............................. 73/195; 73/200; 55/270; 55/274; 55/DIG. 34
[58] Field of Search ............. 73/195, 200, 205 R; 122/492, 508; 55/270, 274, DIG. 34

[56] References Cited

U.S. PATENT DOCUMENTS

| 1,896,894 | 2/1933 | Hawley | 55/274 |
| 2,344,898 | 3/1944 | Rathbun | 55/270 |

Primary Examiner—James J. Gill
Attorney, Agent, or Firm—Arthur L. Wade

[57] ABSTRACT

A centrifugal separator is disclosed as mounted in the steam drum of a utility boiler receiving a mixture of vapor and liquid. Instrumentation is connected to respond to pressure drops associated with the separator to manifest the flow of the mixture and the flow of each separate fluid of the mixture.

3 Claims, 1 Drawing Figure

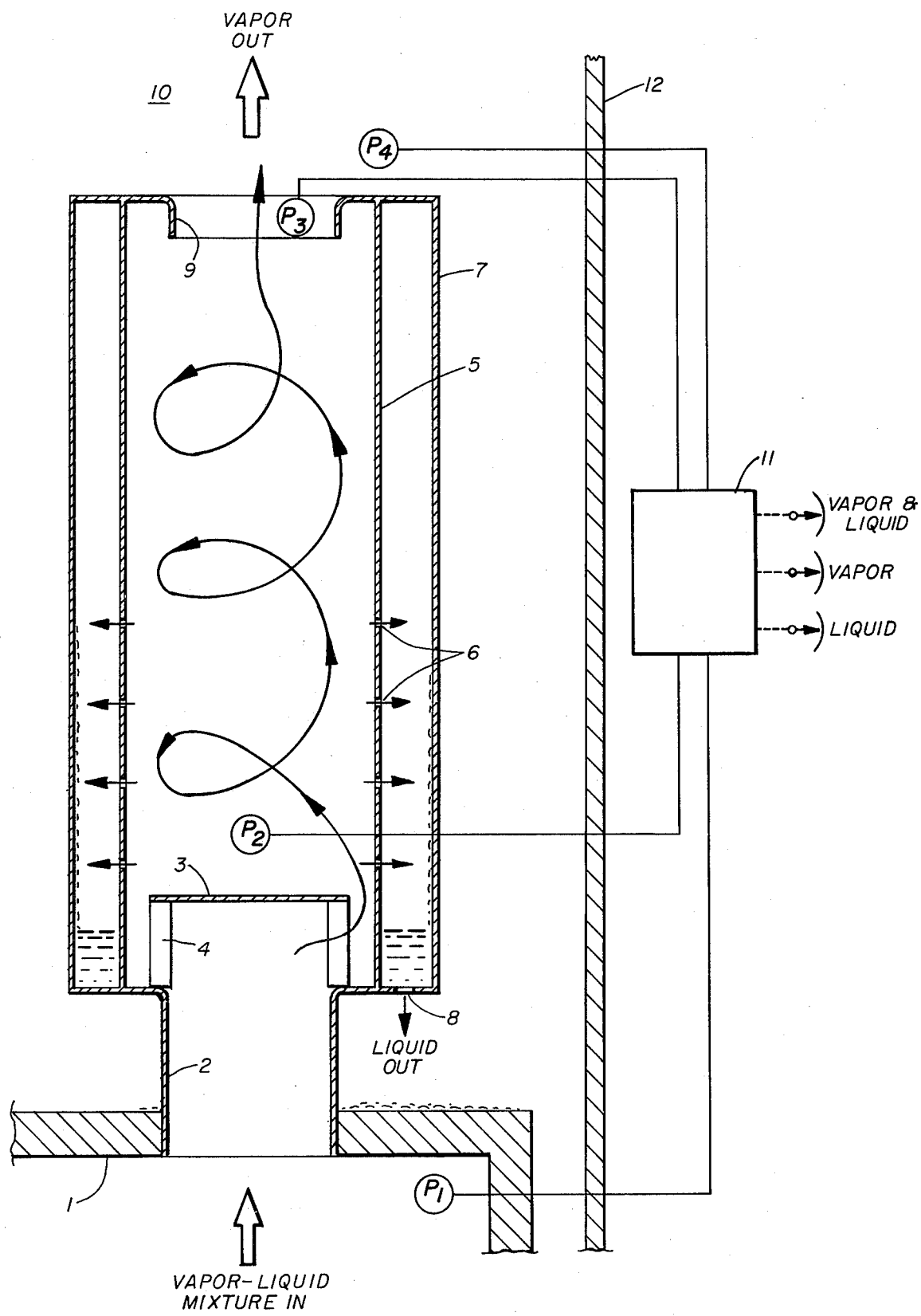

MEASUREMENT OF GAS-LIQUID FLOW

BACKGROUND OF THE INVENTION

1. Field of the Invention

The present invention relates to the measurement of the two-phase flow of vapor and liquid from the steam generation section of a large utility boiler to manifest the liquid phase, which is recirculated within the boiler. More specifically, the invention relates to utilizing the pressure drops, or the pressure differentials, within and across the vapor-liquid separator to manifest the amount of vapor and of liquid in the two-phase mixture and form a guide to design, which, when applied, will avoid excessive liquid carryover with the vapor to the downstream turbine utilizing the vapor.

2. Prior Art

In the large utility boiler, be it thermally energized by the combustion of fossil fuel, or by nuclear reaction, there is ultimately a flow of two-phase vapor and liquid into the upper vapor drum. The vapor from this drum flows to a motive device, such as a turbine to ultimately perform work, usually the generation of electricity. In the vapor drum, it has been customary to mount a plurality of vapor-liquid separators utilizing centrifugal force. These separators receive the vapor-liquid mixture from a plenum and reduce the liquid content of the vapor to ½% or less, by weight, of the total flow.

It is not unusual to think of the overall production of these utility boilers, as in the order of 6 to 8 million pounds of vapor per hour. More closely focusing on the vapor-liquid separator mounted in the vapor drum, it enlarges the perspective to be aware that each separator will receive 30 to 50 thousand pounds per hour of vapor and 1½ to 4½ times that amount of liquid. As said before, the separator is designed to reduce the liquid content of the vapor output to ½% or less.

This mixture flows to the vapor separator at a rate in the order of 20 feet per second, which is increased in circumferential flow, to the order of 40 feet per second to generate centrifugal force utilized to separate the two phases.

Another physical dimension for purposes of perspective is the visualizing of the size of the separators, as in the order of 10" in diameter and 40" high.

Behind the foregoing physical parameter of quantity and size is the fact that measurement of the internally recirculated liquid component of the mixture has not been heretofore directly measured. The liquid has been spun from its association with vapor and discharged from each of the separators, having been joined without a practical way to measure any one, or all, of the liquid flows directly. Of course, this measurement has been indirectly calculated, but a more accurate measurement of the flows for specific separators is needed to enable more efficient operation of the system, and to prevent excessive carryover of liquid with the vapor. Excessive liquid in the vapor supplied to the turbine results in early formation of droplets of liquid that erode the turbine blades, in addition to reducing the vapor cycle efficiency. To insure that good quality vapor is supplied to the turbine, extreme conservatism is required in the pressure drops across the separator, and in the number of units used. During periods of low power operation, the vapor flow is a fraction of the full power flow rate, and the vapor velocity is so low that there can be gravity separation of the liquid. If this occurs, there is little or no recirculation of the liquid in the boiling region of the tubes. The duration of this undesirable operating condition can be minimized by system controls, which can be tuned to the measured recirculating liquid flow.

Strictly for the purposes of giving a restrictive scope to terminology, it is to be understood that the more common, practical, vapor is steam generated by heating water. When a vapor generator is referred to, it is to be understood that this vapor is most commonly, simply steam. Further, the liquid separated from the steam is water, and violence will not be done to the scope of the invention by consistent use of this terminology. There remains the problem of measuring the flow rate of water associated with steam.

SUMMARY OF THE INVENTION

The present invention contemplates the establishment of pressure and pressure drop sensors in and across the centrifugal vapor-liquid separator mounted in the vapor drum of a utility boiler, in order to generate pressure information, which will enable separated liquid flowing from the separator to be directly manifested.

The invention utilizes the nozzle structure in the separator vapor output for generation of pressure differential positively related to separator vapor flow through the nozzle. Pressure differentials are also established across the complete separator, which will manifest the total flow of liquid and vapor through the separator.

The invention further contemplates manifestation of liquid flow of a vapor-liquid mixture through the separator, which determines the number of separators required in the vapor drum to produce vapor of required quality.

Other objects, advantages and features of the invention will become apparent to one skilled in the art upon consideration of the written specification, appended claims and accompanying drawings.

BRIEF DESCRIPTION OF THE DRAWINGS

The drawing is a sectioned elevation of a vapor-liquid separator, mounted in a vapor drum of a utility boiler, with instruments connected thereto to manifest the flow of liquid through the separator and embodying the invention.

DESCRIPTION OF THE PREFERRED EMBODIMENT

Before launching into a description of the preferred embodiment of the invention as illustrated in the drawing, reemphasis is placed upon the terminology conventions. In the interest of breadth, the mixture of fluids separated is initially referred to as vapor and liquid. In the preferred embodiment of the invention, the steam and water of a utility boiler are separated. Any inconsistency in the use of these terms is inadvertant and should not obscure the fact that steam and water separation is included within the concept of vapor and liquid separation. For the purposes of this disclosure, the terms are interchangeable without limiting the breadth of the invention.

The drawing is a sectioned elevation of a vapor-liquid separator, mounted in a vapor drum of a utility boiler, with instruments connected.

To be economical with the disclosure, and hopefully, to emphasize the invention, the drawing is simply the sectioned elevation through only one of the steam separators in a utility boiler. The separator Deck 1, together with the tube bundle shroud, enclose the steam generation section. The difference in density between the recirculating water outside the tube bundle shroud and the mixture of steam and water within the steam generation section results in a pressure differential that produces the flow of steam and water through the conduit 2. The upward flow of the steam-water mixture is blocked by the baffle 3, so that the mixture is directed through the multiple vanes 4, which are so angled as to cause rotational or circumferential motion at high velocity of the fluid inside the shell 5. This centrifugal action separates the steam and water, the steam moving inward and the higher density water outward, pressing against the internal wall of the shell 5. Starting a short distance up the shell is a multitude of holes or perforations 6, providing a passage for water outward, and then downward to the separator deck 1. Surrounding the shell 5 is a shroud 7, sealed to the external wall of the shell 5 at the top and having a restriction 8 at the bottom, which effectively maintains a water seal to insure that all of the steam exits through the nozzle structure 9 into the steam dome region 10.

Below the separator deck 1 is mounted the pressure sensor $P_1$, and in the steam drum region 10 is pressure sensor $P_4$, which together measure the pressure differential across the separator, which manifests the total steam and water flow. Pressure sensor $P_2$ is located on the axis of the separator just above the baffle 3, and pressure sensor $P_3$ is centrally located in the nozzle structure 9. The pressure difference between $P_2$ and $P_3$ is used to manifest the steam flow exiting the separator.

$P_1$ and $P_4$ are connected to a station 11, simply illustrated with the "black box" convention and positioned outside of the steam dome wall 12. By the circuits within station 11, the differentials between the inputs from pressure sensor $P_1$ and pressure sensor $P_4$ are translated into terms of the total flow of steam and water through the separator. Pressure sensor $P_2$ and pressure sensor $P_3$ are also connected to station 11, the differentials of their inputs being translated into units of steam flow through the separator. Thus, the information available from all of the pressure sensors can be readily processed to manifest the total flow of steam and water, the flow of steam and the flow of water. It is not deemed necessary to clutter the disclosure with detailed representation of instruments responding to these differential pressures to provide the manifestations desired. It is well-known that the differential pressure across the flow restriction has a definite relationship to the rate of fluid flow through the restriction, and manipulation of this data is a well-known practice in the art of instruments and controls.

The basic equation relating the velocity of a fluid—either liquid or vapor—and static head is well-known, $H = V^2/2G$. In consistent units, H is head in feet, V is velocity in feet per second, and G is the acceleration due to gravity in feet per second per second. This relationship is applied to measure the flow of a fluid through a calibrated orifice or nozzle by the use of a calibration constant, K:

$$\Delta P = K V^2 \rho / 2G.$$

While this equation cannot be applied to a mixture of liquid and vapor flowing through an orifice or other restriction, the test data on flow of liquid and vapor through a separator have been correlated by a similar equation:

$$\Delta P = C Q^2 \bar{\rho}$$

or the equation and description might be:

$$\Delta P = C(W_v V_v + W_l V_l)^2 \bar{\rho}$$

W is the mass flow per unit of time, and V is the volume per unit mass, while the subscripts V and L represent vapor and liquid, respectively. The expression within the parentheses is the volumetric flow. The average density, $\bar{\rho}$, is defined by $\bar{\rho} = (W_v + W_l)/(W_v V_v + W_l V_l)$, $\Delta P$ is the pressure drop across the separator, and C is the calibration constant. Sutstituting and rearranging gives:

$$\Delta P = C(W_l + W_v)(W_l V_l + W_v V_v)$$

This equation is a quadratic in both $W_l$ and $W_v$, so if one flow is known, it is possible to solve explicitly for the other. By calibrating the steam outlet or exit orifice of the steam separator and measuring the pressure drop, the flow of separated steam, $W_v$, can be determined. Solving for the flow of separated water, $W_l$, gives:

$$W_l = 0.5\{[4\Delta P/CV_l + W_v^2(V_v/V_l - 1)^2]^{\frac{1}{2}} - W_v(V_v/V_l + 1)\}$$

To obtain the data necessary for the solution of this equation and for the steam flow, $W_v$, one absolute pressure and two pressure differences are required, as well as the calibration constant, C, which is determined by tests prior to installation in the steam generator. The absolute pressure is required to establish the specific volumes, $V_v$ and $V_l$, which are obtained from a steam table.

The present disclosure is directed to the flow of fluids through a single separator mounted on deck 1. The separator is "instrumented" to provide the manifestation of fluid flow through the separator. Although this disclosure depicts the automatic resolution of the data available from the pressure sensors, it is to be understood that their information could be manipulated by hand calculations with the use of slide rules or hand calculators.

The water flow manifestation provided by station 11 can be utilized to adjust the design and operate the steam generator to limit the amount of water in the mixture, and therefore, control the quality of steam output from the drum. On the other hand, this manifestation can be simply utilized as a guide to the number and distribution of steam separators mounted within the steam generator to produce the desired quality of steam output from the unit.

In the claims following this specification, the pressure sensors may be referred to in an order not followed in the foregoing designations $P_1$, $P_2$, $P_3$, and $P_4$. For example, pressure sensors $P_1$ and $P_4$ may be referred to as the first and second pressure sensors whose data may be manifested in terms of the total flow of steam and water through the separator, $P_2$ and $P_3$ may be referred to as the third and fourth pressure sensors whose differential manifests the flow of steam through the separator. The options of designation are to be kept open, careful attention being given to the specific sensor and its function.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A system for measuring the flow of vapor and liquid phases through a centrifugal separator, including,
   a cylindrical tube, which is vertically oriented,
   means for introducing a mixture of liquid and vapor mounted on the lower end of the tube and creating a centrifugal force on the mixture,
   perforations through the side of the tube to function as passages for the liquid centrifuged to the internal wall of the tube,
   a restrictive structure mounted on the upper end of the tube for the flow of the vapor from the tube,
   a first pressure sensor mounted to respond to the pressure upstream of the tube,
   a second pressure sensor mounted to respond to the pressure downstream of the tube,
   an instrument station connected to both pressure sensors to respond to the differentials of their inputs to the station in terms of total flow of vapor and liquid through the tube,
   a third pressure sensor mounted within the cylindrical tube responding to the pressure of the separated vapor flowing to the restrictive structure,
   a fourth pressure sensor mounted in the cylindrical tube so as to respond to the lowest pressure developed by the restrictive structure, and
   connections between the third and fourth pressure sensors and the instrument station to manifest differentials between the outputs of the third and fourth pressure sensors in terms of the flow of the vapor,
   whereby the arrangement within the control station automatically manifests the flow of vapor and flow of liquid separately.

2. The system of claim 1, including,
   a shroud mounted external of the cylindrical tube forming a chamber into which the separated liquid is flowed from the passages of the perforations, and
   a flow restriction formed in the lower part of the chamber sized to provide a liquid seal for the chamber which will prevent the passage of vapor through the perforations and into the chamber and out of the restriction.

3. The system of claim 2, wherein,
   the restrictive structure for the vapor mounted at the upper outlet of the cylindrical tube is in the form of a nozzle.

* * * * *